United States Patent
Wechselberger et al.

(10) Patent No.: US 10,527,486 B2
(45) Date of Patent: Jan. 7, 2020

(54) WEIGHING SCALE DIAGNOSTICS METHOD

(71) Applicant: Mettler-Toledo, LLC, Columbus, OH (US)

(72) Inventors: Eric V. Wechselberger, Powell, OH (US); Jodelle D. Sparks, Delaware, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 166 days.

(21) Appl. No.: 15/450,967

(22) Filed: Mar. 6, 2017

(65) Prior Publication Data

US 2017/0176242 A1    Jun. 22, 2017

Related U.S. Application Data

(63) Continuation of application No. 14/337,127, filed on Jul. 21, 2014, now Pat. No. 9,587,974.

(51) Int. Cl.
*G01G 23/01* (2006.01)
*G01G 23/37* (2006.01)

(52) U.S. Cl.
CPC ......... *G01G 23/01* (2013.01); *G01G 23/3735* (2013.01)

(58) Field of Classification Search
CPC ........................... G01G 23/01; G01G 23/3735
See application file for complete search history.

(56) References Cited

U.S. PATENT DOCUMENTS

| | | |
|---|---|---|
| 4,804,052 A | 2/1989 | Griffen |
| 4,909,338 A | 3/1990 | Vitunic et al. |
| 5,296,655 A | 3/1994 | Sargent et al. |
| 6,112,162 A | 8/2000 | Richards |
| 6,260,003 B1 | 7/2001 | Bagley et al. |
| 6,552,278 B2 | 4/2003 | Johnson |
| 6,576,849 B2 | 6/2003 | Bliss et al. |
| 6,801,866 B1 | 10/2004 | Yarian |
| 6,950,031 B2 | 9/2005 | Selig et al. |
| 8,022,316 B2 | 9/2011 | Trautweiler et al. |
| 8,601,575 B2 | 12/2013 | Mullarkey et al. |
| 8,648,266 B2 | 2/2014 | Bucher et al. |
| 2002/0066602 A1 | 6/2002 | Bliss et al. |

(Continued)

FOREIGN PATENT DOCUMENTS

JP    2012247335 A    12/2012

*Primary Examiner* — Natalie Huls
(74) *Attorney, Agent, or Firm* — Standley Law Group LLP; Jeffrey S. Standley; Eric M. Gayan

(57) ABSTRACT

Embodiments of the invention generally relate to weighing scale diagnostic methods employing a comparison of like component operating parameters. In certain embodiments, weighing scale component output signals may be analyzed to calculate the difference between any two current weighing scale component operating parameter values, and the calculated difference may be compared against a maximum allowable difference for determining if a problem exists. Alternatively, a statistical analysis may be performed that considers the output signal of a given weighing scale component relative to the output signal of another weighing scale component or to the collective output signals of all of the other weighing scale components, and the comparison may be used to determine if a problem exists.

2 Claims, 5 Drawing Sheets

(56) References Cited

U.S. PATENT DOCUMENTS

| | | |
|---|---|---|
| 2004/0026135 A1 | 2/2004 | Huitt et al. |
| 2004/0050593 A1 | 3/2004 | Baeumel et al. |
| 2004/0135355 A1 | 7/2004 | Selig et al. |
| 2011/0155474 A1 | 6/2011 | Rice |
| 2012/0059626 A1* | 3/2012 | Li .................. G01G 11/003 702/173 |
| 2015/0268089 A1 | 9/2015 | Xie et al. |

* cited by examiner

WEIGHING SCALE DIAGNOSTICS METHOD

CROSS-REFERENCE TO RELATED APPLICATION

This application is a continuation of U.S. patent application Ser. No. 14/337,127 filed on Jul. 21, 2014, which is hereby incorporated by reference in its entirety.

TECHNICAL FIELD

Embodiments of the invention generally relate to weighing scale diagnostic methods employing a comparison of like component operating parameters.

BACKGROUND

Weighing scales exist in many forms, from small laboratory scales to large vehicle weighing scales. Of particular interest herein are weighing scales having multiple force measuring devices, which force measuring devices may be modular in nature.

A scale having multiple force measuring devices will also typically include a frame, a load receiving surface that interfaces with the force measuring devices, and a controller and/or monitor that receives signals from the force measuring devices and typically provides a readout of the weight of an object residing on the scale.

A vehicle weighing scale is a common example of a multiple force measuring device weighing scale. A typical vehicle weighing scale includes at least one scale platform (or deck) for receiving a vehicle to be weighed. Such a scale platform is often comprised of a metal framework with a steel plate deck, or the scale platform may be comprised of concrete (typically enclosed within a steel frame). The scale platform is normally supported from beneath by a number of force measuring devices, such as load cells. Vehicle weighing scales are also typically constructed with two rows of load cells aligned in the direction of vehicle travel across the scale platform. When a vehicle is placed on the scale platform, each load cell produces an output signal that reflects the portion of the vehicle weight borne by that load cell. The signals from the load cells are added to produce an indication of the total weight of the vehicle residing on the scale platform of the weighing scale.

Vehicle weighing scales, and their associated scale platforms, can be of various size. For example, such vehicle weighing scales are commonly of a size that is sufficient to accommodate a multi-axle vehicle, such as a semi-truck trailer. Vehicle scales of such size may be assembled using multiple scale platform segments (modules) that are connected end-to-end to provide a full-length scale platform.

As should be obvious, the ability to monitor a weighing scale for proper function is desirable. In order to do so, a monitoring methodology must be developed and particular scale behavior, or the behavior (e.g., operating characteristics) of one or more scale components must be evaluated.

It is known to evaluate weighing scale function by monitoring the operational characteristics of the scale's force measuring devices. More particularly, one or more selected force measuring device operational characteristics may be monitored and compared to a corresponding expected operational characteristic. Associated threshold values may then be set around the expected operational characteristic, with a reading below or above said threshold values being indicative of improper operation or some other problem.

A negative issue associated with such a known evaluation methodology is that of setting individual component operating characteristic threshold values. The threshold values are generally set to trigger an alarm or to provide some other notice or indication if monitored force measuring device operational characteristics exceed the preset threshold values. However, in practice it is often difficult to determine the correct individual component operating characteristic threshold value to apply. For example, an individual component operating characteristic threshold value that is set too low may trigger false alarms, while a threshold value that is set too high may not trigger an alarm when a problem actually exists. This problem may be exacerbated when the normal value range for a given operating characteristic is very small. Likewise, it may also be particularly difficult for an end user without appropriate technical knowledge and/or training to select appropriate individual component operating characteristic threshold values, which may be required in some cases.

From the foregoing discussion, it should be apparent that there is a need for improved weighing scale diagnostic methods. Exemplary method embodiments described herein satisfy this need.

SUMMARY

Exemplary weighing scale diagnostic method embodiments described herein generally include monitoring and comparing one or more operating parameters of like scale components, which are, for purposes of the invention, scale components that under normal conditions will have at least one common monitorable parameter that has approximately the same value for each component. Exemplary weighing scale diagnostic method embodiments described herein are, therefore, adapted particularly for use with weighing scales having multiple like components. Like weighing scale components may include, but are not limited to, a plurality of the same or similar force measuring devices, which may be in the form of force measuring modules. An operating parameter of such a like component may be any component parameter having a monitorable output that may be used as an indicator of component or scale health. With respect to force measuring devices, such operating parameters may include, but are not necessarily limited to, zero balance change (i.e., weight output change over time with only the dead load applied), temperature, digital signal voltage and supply voltage.

Unlike the aforementioned known methods of evaluating weighing scale function, which require the establishment and setting of individual component operating characteristic threshold values, exemplary method embodiments according to the invention may be practiced by comparing the same parameter of a plurality of like components present in a given weighing scale. For example, various operating parameters of the force measuring devices present in a multiple force measuring device weighing scale may be compared and evaluated.

Since the simultaneous failure of several weighing scale components is an unlikely occurrence, it is possible to evaluate component or scale health by selecting as a diagnostic parameter a given operating parameter that is common to all of a plurality of like components that are present in a given weighing scale, and then comparing the values of the selected diagnostic parameters of all the like components. A component with a monitored diagnostic parameter having a value that is an outlier in comparison to (i.e., that deviates too far from) the diagnostic parameter values of the other like components of the scale may be indicative of a problem with the associated component. Consequently, scale health may be evaluated by setting a limit on the relative difference (spread) between the diagnostic parameter values of the like components. Alternatively, a limit may be set on the deviation of a given diagnostic parameter value from a calculated measure of central tendency of the diagnostic parameters of the other like components, wherein the central tendency is defined as the central or typical value associated with a probability distribution and wherein common measures of central tendency include but are not limited to the arithmetic median, mean and mode. Still alternatively, a standard statistical test may be applied to detect an outlying diagnostic parameter value.

In any case, threshold values do not need to be set on a diagnostic parameter value itself. That is, the determination of whether or not a given diagnostic parameter value indicates a problem does not depend on a specific value itself, but rather on how the value compares to the diagnostic parameter values of the other like components. This allows the diagnostic parameter comparison to adapt to changing conditions, which is useful because in one case specific diagnostic parameter values may be indicative of a problem while in another case the same specific diagnostic parameter values may not be indicative of a problem.

One exemplary weighing scale diagnostic method includes selecting a plurality of like weighing scale components to be monitored; selecting an operating parameter common to the selected weighing scale components as a diagnostic parameter; receiving at a computer device output signals representative of the selected diagnostic parameter from each of the selected scale components; comparing the output signal value received from each selected weighing scale component to the output signal values received from all of the other selected weighing scale components; calculating the maximum difference between the output signal values of any two selected weighing scale components; comparing the maximum difference between the output signal values of any two selected weighing scale components with a maximum allowed difference; and, if the calculated difference is determined to exceed the maximum allowed difference, indicating a weighing scale component problem.

Another exemplary weighing scale diagnostic method includes selecting a plurality of like weighing scale components to be monitored; selecting an operating parameter common to the selected weighing scale components as a diagnostic parameter; receiving at a computer device output signals representative of the selected diagnostic parameter from each of the selected scale components; calculating a measure of central tendency of the received diagnostic parameter output signal values received from the selected weighing scale components; comparing the diagnostic parameter output signal value of each weighing scale component to the calculated measure of central tendency value; calculating a deviation of the diagnostic parameter output signal value of each weighing scale component from the calculated measure of central tendency value; and, if the calculated deviation associated with a given weighing scale component exceeds a maximum allowed deviation, indicating a problem with that weighing scale component.

Yet another exemplary weighing scale diagnostic method includes selecting a plurality of like weighing scale components to be monitored; selecting an operating parameter common to the selected weighing scale components as a diagnostic parameter; receiving at a computer device output signals representative of the selected diagnostic parameter from each of the selected scale components; applying a standard statistical test for outliers; and, if the diagnostic parameter value associated with a given weighing scale component is statistically determined to be an outlier, indicating a problem with that weighing scale component.

In such exemplary implementations, the weighing scale may be a vehicle scale. In such exemplary implementations, the weighing scale components to be monitored are the force measuring devices (e.g., modules) of the weighing scale, and the force measuring devices may be load cells. In such exemplary implementations, the selected diagnostic parameter may be for example the load cell temperature, digital signal voltage, supply voltage, or zero balance change.

According to one exemplary implementation of a diagnostic method of the invention, the selected diagnostic parameter is the temperature of the individual force measuring devices of a multiple force measuring device weighing scale. In this exemplary implementation, the temperature of all the like force measuring devices in the system is monitored. A temperature output is typically available from force measuring devices such as load cells for use by a load cell metrology compensation algorithm. The temperature of the force measuring devices is primarily determined by the environmental temperature and, therefore, should be approximately the same for all of the like force measuring devices of the scale. While some small difference in individual force measuring device temperature readings may be expected due to the physical distance between the force measuring devices, a temperature difference between any two like force measuring devices that exceeds some difference limit, a temperature of a given force measuring device that deviates more than some maximum allowed amount from a calculated measure of central tendency of the temperature value of the other like force measuring devices, or a temperature of a given force measuring device that is determined by statistical analysis to be an outlier from the temperature of other like force measuring devices may indicate a problem (e.g., a failing temperature sensor) and can be used to trigger an alert, such as an alarm.

According to another exemplary implementation of a diagnostic method of the invention, the selected diagnostic parameter is the supply voltage of the individual force measuring devices of a multiple force measuring device weighing scale. In this exemplary implementation, an operating supply voltage is provided by a controller (e.g., a terminal) to all of the like force measuring devices of the scale. The supply voltage at each force measuring device is monitored. The supply voltage should be approximately the same for all of the force measuring devices in the system. While some small difference in the individual supply voltage values can be expected due to varying cable lengths, a supply voltage difference between any two like force measuring devices that exceeds some difference limit, a supply voltage of a given force measuring device that deviates more than some maximum allowed amount from a calculated measure of central tendency of the supply voltage of the other like force measuring devices, or a supply voltage of a given force measuring device that is determined by statistical analysis to be an outlier based on the supply voltages of the other like force measuring devices may indicate a problem (e.g., a damaged cable) and can be used to trigger an alert, such as an alarm.

Yet another exemplary diagnostic method embodiment of the invention includes selecting a plurality of like weighing scale components to be monitored; selecting an operating parameter common to the selected weighing scale components as a diagnostic parameter; receiving at a computer device output signals representative of the selected diagnostic parameter from each of the selected scale components; calculating a deviation of the output signal value received from each selected scale component with a stored value established during a known good state of operation (e.g., at calibration); calculating a total deviation by summing the calculated output signal value deviations of each selected scale component; comparing the calculated total deviation against a first predetermined threshold value; if the total deviation is determined to exceed the first predetermined threshold value, calculating the percentage of total deviation that is attributable to each selected scale component and then comparing the percentage of total deviation that is attributable to each selected scale component to a second predetermined threshold value; and if the total deviation attributable to a given selected scale component is determined to exceed the second predetermined threshold value, indicating a problem with that selected scale component.

A weighing scale evaluated using a method wherein the percentage of total deviation that is attributable to each selected scale component is compared to a second predetermined threshold value may be also be a vehicle scale, the weighing scale components to be monitored may again be the force measuring devices of the weighing scale, and the force measuring devices may be load cells (e.g., load cell modules). In such an exemplary implementation, the selected diagnostic parameter may be the zero drift of the force measuring devices (e.g., load cells), the calculated deviation of the output signal value received from each force measuring device may be the zero drift of each force measuring device, and the calculated total deviation may be the total zero drift of the scale. In such an exemplary implementation, the first predetermined threshold value may be some percentage of scale capacity and the second predetermined threshold value may be some percentage of total zero drift.

According to one such exemplary implementation of this diagnostic method, the selected diagnostic parameter is the zero balance change of the individual force measuring devices (e.g., load cell modules) of a multiple force measuring device weighing scale. The zero balance change is the difference between the zero balance value at the current time compared with its value at the time of calibration. In this exemplary implementation, the zero balance change of all the individual force measuring devices is monitored. The zero balance change should be approximately the same for all of the force measuring devices of the scale. While some small difference in the zero balance change can be expected due to the accumulation of debris on the scale platform, a zero balance change of a given force measuring device that represents a significant percentage of the total zero balance change of all the force measuring devices may indicate a problem (e.g., a failing force measuring device) and can be used to trigger an alert, such as an alarm.

Diagnostic method embodiments according to the invention are implemented on a computer device, such as a processor executing appropriate instructions. The processor may be associated with a software program for this purpose. In at least some embodiments, the computer device may be a scale terminal, which is a device that is in wired or wireless communication with the scale and may function to control the scale, display weight readings, display diagnostic information, etc. In other embodiments, diagnostic methods according to the invention may be carried out on a computer device that is separate from the scale terminal, and which may or may not be in communication therewith.

Other aspects and features of the invention will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENT(S)

As explained above, weighing scales exist in many forms, sizes and capacities. While method embodiments of the invention are not limited in application to weighing scales of any particular form, size or capacity, said methods are adapted for use with weighing scales having a plurality of like components. The like components may be force measuring devices. The force measuring devices may be load cells or other devices usable to provide weight indicative readings in one form or another.

Figure 1:
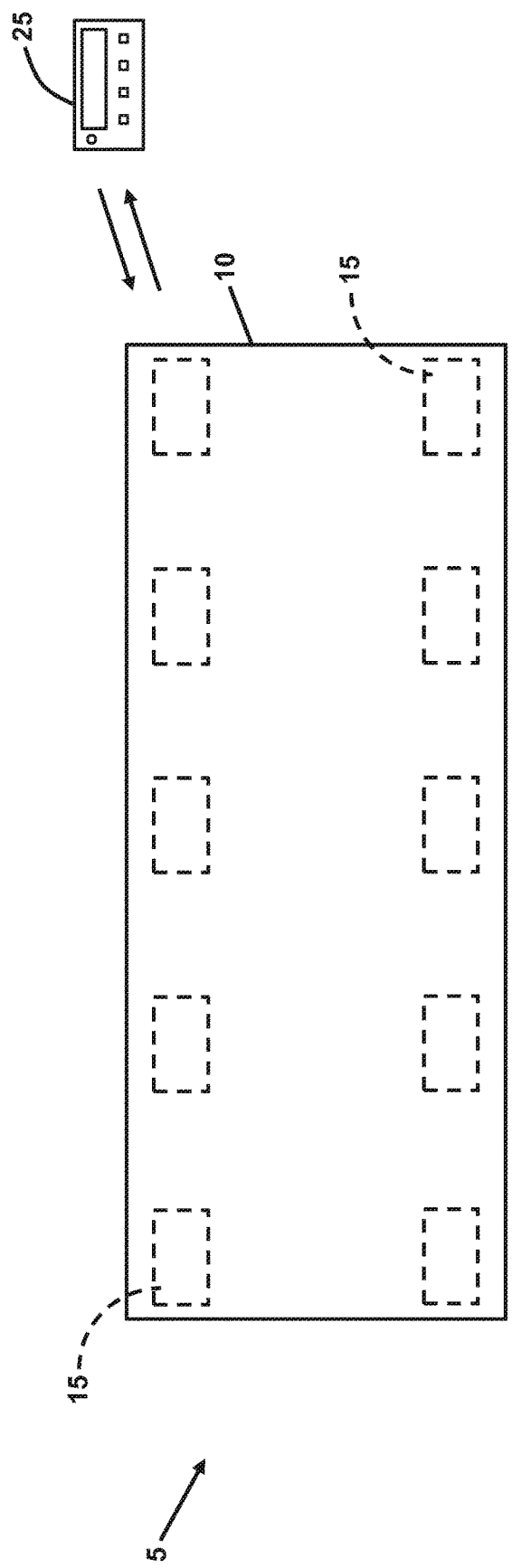
FIG. 1 schematically represents a typical vehicle weighing scale having multiple force measuring devices in the form of load cells.
Figure 2:
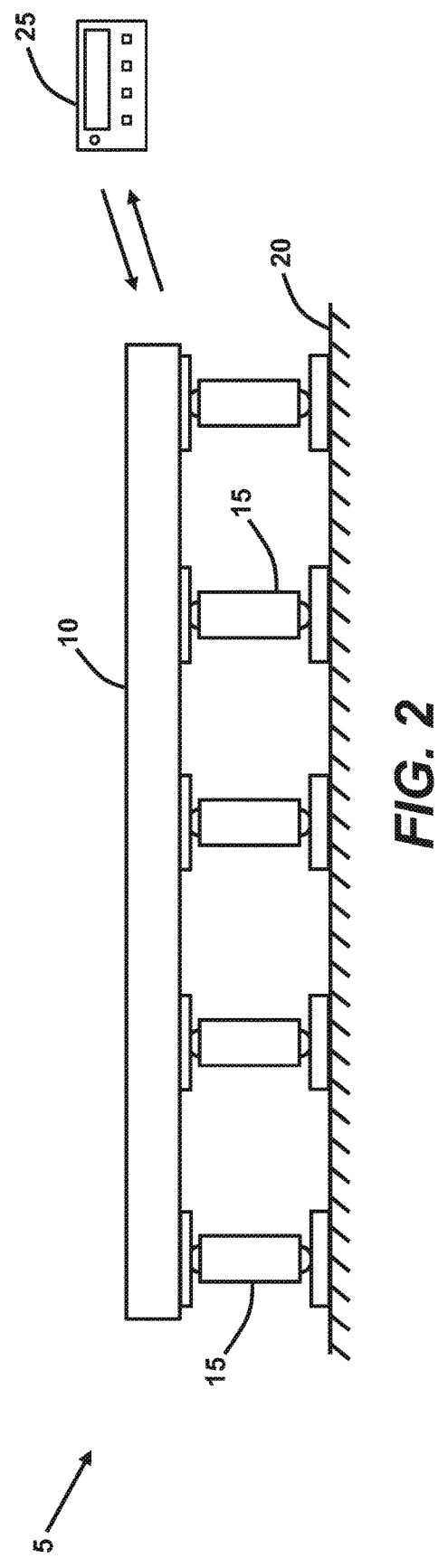
FIG. 2 is a side view of the exemplary weighing scale of FIG. 1.

One common exemplary embodiment of a multiple force measuring device weighing scale is a multiple-load cell vehicle scale. One such exemplary vehicle scale 5 is depicted in FIGS. 1-2 for purposes of further illustrating method embodiments of the invention. As shown, this exemplary scale 5 includes a load receiving platform 10 supported by ten subjacent digital load cells 15 that are arranged in rows of two along the length of the load receiving platform. The load cells 15 reside between an underside of the load receiving platform 10 and the ground 20 or another support surface. In this particular example, the load cells 15 are of rocker pin design, such that the load cells may tilt in response to the entry or exit of a vehicle and subsequently return to substantially the same upright position. The reliability of the load cells 15 is such that the simultaneous failure of several load cells is an unlikely occurrence.

At least the load cells 15 of the scale 5 are also in wired or wireless communication (as indicated by the bi-directional arrows) with a computer device 25 that is operative to control the scale, to display weight readings when the scale is loaded, and possibly to display diagnostic information related to the scale and its components. In this particular exemplary embodiment, the computer device is a scale terminal, which includes a processor, memory, and appropriate programming.

When an object to be weighed (a vehicle, in this case) is located on the load receiving platform 10, the weight of the vehicle exerts a force on the load cells 15, each of which generates a digital output signal indicative of the weight supported by that load cell. Typically, the load cell output is corrected, as would be well known to one of skill in the art. The digital output signals can be summed to obtain the weight of the vehicle on the load receiving platform 10. The correction and summing functions may be performed at the terminal 25, or elsewhere.

One skilled in the art would understand that a variety of such scales exist, and this particular embodiment is presented only for purposes of illustration. Furthermore, method embodiments according to the invention are applicable to other scale and force measurement device designs.

Using still the vehicle scale 5 as an example, scale functionality may be evaluated in one embodiment by selecting as a diagnostic parameter(s) one or more operating parameters that are common to each of the load cells 15. The selected diagnostic parameter(s) have approximately the same value for each load cell during normal operation. This diagnostic parameter(s) is then monitored for each load cell 15 and the detected value associated with the diagnostic parameter(s) of each load cell 15 is compared with the detected values associated with the same diagnostic parameters of the other load cells 15.

As described above, exemplary embodiments of the invention may be implemented by setting a limit on the allowable relative difference between the monitored diagnostic parameters of the selected weighing scale components, by comparing the diagnostic parameter output signal value of each selected weighing scale component to a calculated measure of central tendency (e.g., median) of the diagnostic parameter output signal value of the selected weighing scale components, and/or by performing a standard statistical test for outliers (e.g., Chauvenet's Criterion, Grubbs' Test for Outliers, Peirce's Criterion, Dixon's Q Test, etc.) on the monitored diagnostic parameters of the selected weighing scale components. An illustration of exemplary embodiments of said methods may be easily made using the exemplary vehicle weighing scale depicted in FIGS. 1-2.

Figure 3:
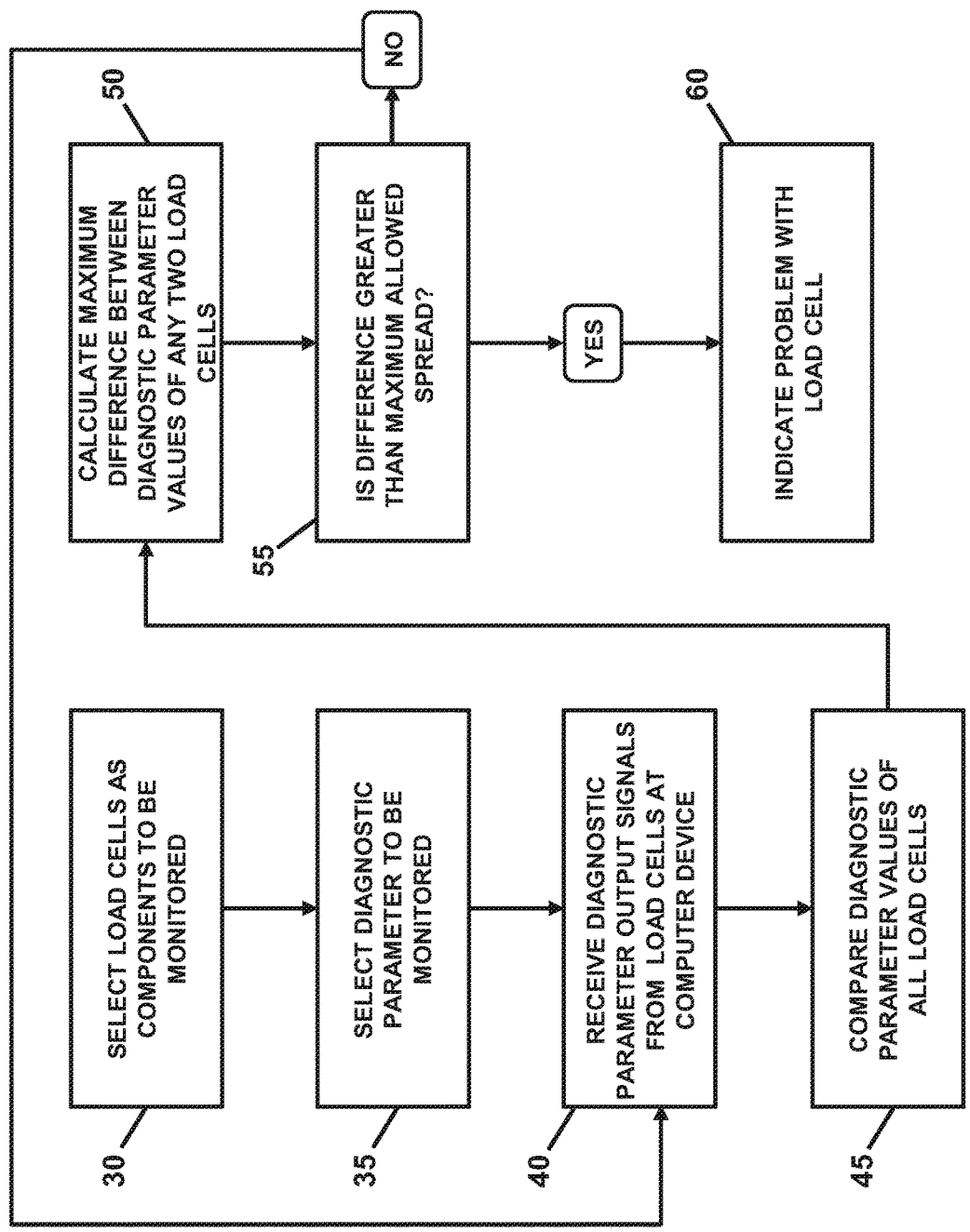
FIG. 3 is a flowchart illustrating the implementation of one exemplary diagnostic method according to the invention.

In one exemplary diagnostic method, which is represented in the flow chart of FIG. 3, the load cells 15 of the scale 5 are selected as the component to be monitored 30 and a diagnostic parameter (e.g., temperature, digital signal voltage, supply voltage, or zero balance change) of the individual load cells 15 of the vehicle weighing scale 5 is selected to be monitored 35. Appropriate diagnostic parameter signals from the load cells 15 are received 40 by the computer device (e.g., terminal) 25.

Once the diagnostic parameter signals are received 40 from all of the load cells 15, the diagnostic parameter value of each load cell 15 is compared to the diagnostic parameter values of the other load cells 45, and a calculated difference between the diagnostic parameter values of any two load cells is calculated 50. The calculated differences between the diagnostic parameter values of all the load cells are then evaluated 55. If the difference in diagnostic parameter values between a given load cell and the other load cells 15 does not exceed a maximum allowed spread, then no problem is indicated and the process returns to the point of receiving a new set of diagnostic parameter signals 40 from all of the load cells 15. If the difference in diagnostic parameter values between a given load cell and the other load cells 15 exceeds a maximum allowed spread, then a problem with that load cell is indicated 60.

Figure 4:
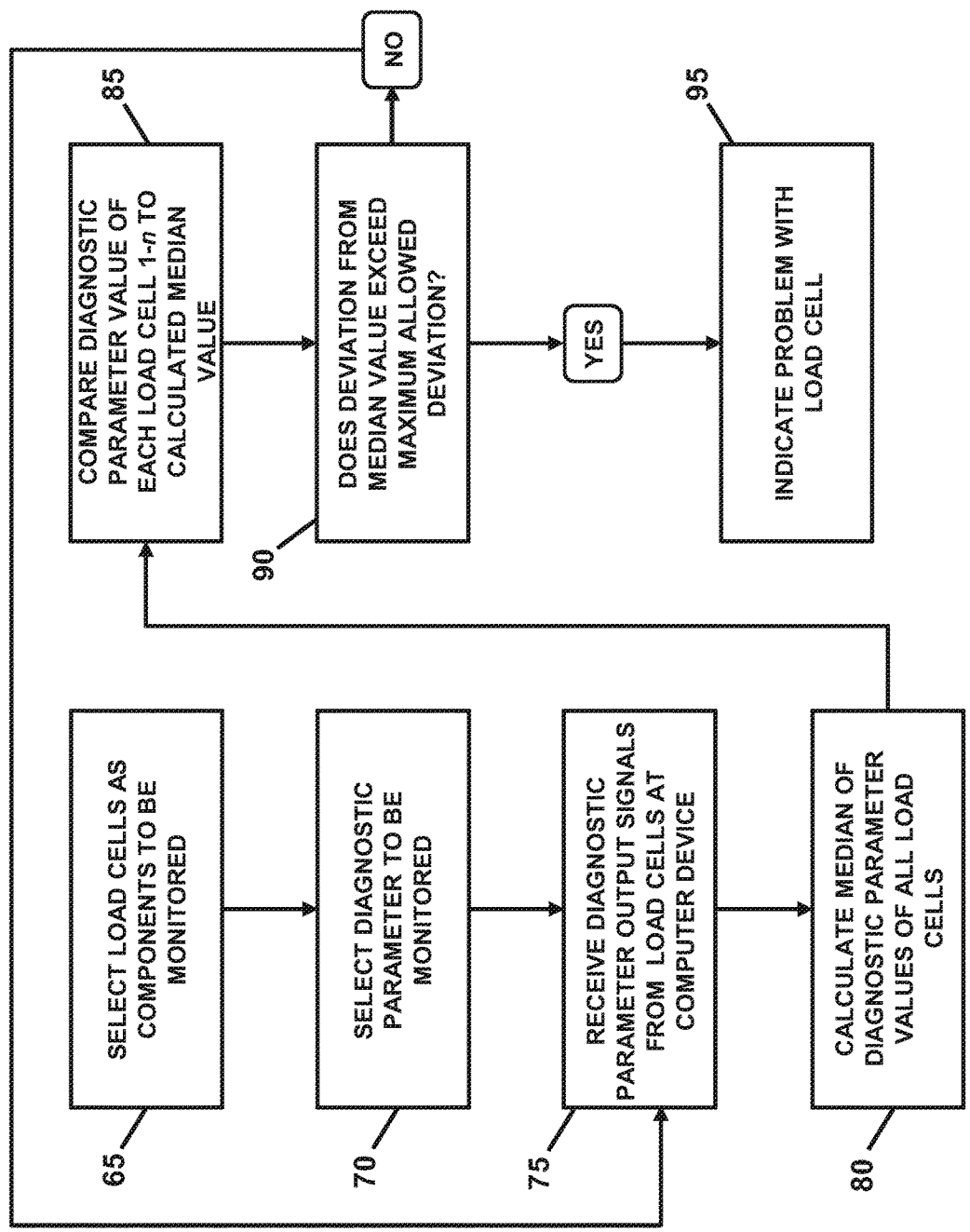
FIG. 4 is a flowchart illustrating the implementation of another exemplary diagnostic method according to the invention.

In another exemplary diagnostic method, which is represented in the flow chart of FIG. 4, the load cells 15 of the scale 5 are selected as the component to be monitored 65 and a diagnostic parameter (e.g., temperature, digital signal voltage, supply voltage, or zero balance change) of the individual load cells 15 of the vehicle weighing scale 5 is selected to be monitored 70. Appropriate diagnostic parameter signals from the load cells 15 are received 75 by the computer device (e.g., terminal) 25.

Once the diagnostic parameter signals are received 75 from all of the load cells 15, the median value of all of the diagnostic parameter values is calculated 80. The diagnostic parameter value of each load cell 15 is then compared to the calculated median diagnostic parameter value 85 and the deviation of each load cell diagnostic parameter value from the median diagnostic parameter value is evaluated 90. If the deviation of the diagnostic parameter value of a given load cell from the calculated median diagnostic parameter value does not exceed a maximum allowed deviation, then no problem is indicated and the process returns to the point of receiving a new set of diagnostic parameter signals 75 from all of the load cells 15. If the deviation of the diagnostic parameter value of a given load cell from the calculated median diagnostic parameter value does exceed a maximum allowed deviation, then a problem with that load cell is indicated 95.

Figure 5:
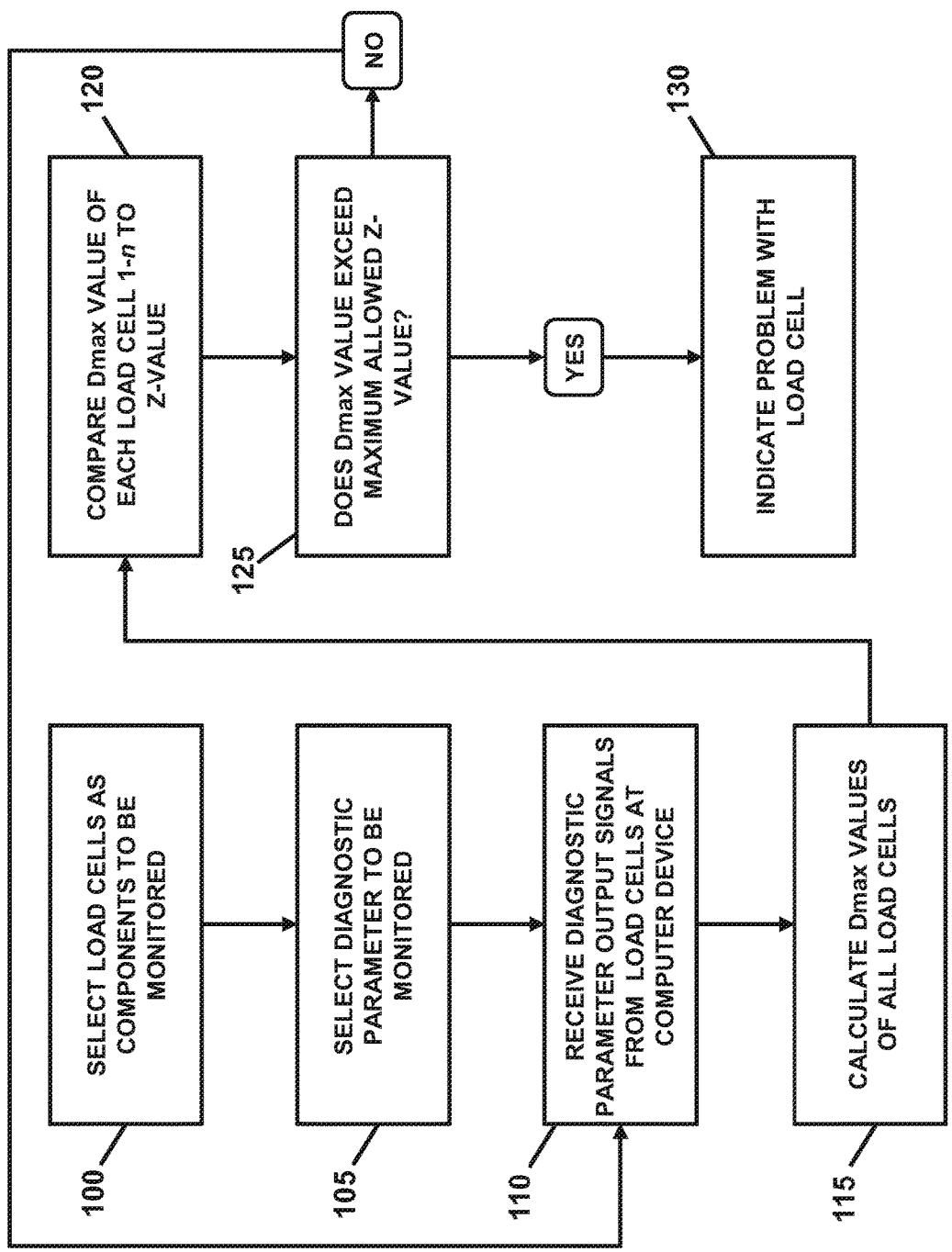
FIG. 5 is a flowchart illustrating the implementation of yet another exemplary diagnostic method according to the invention.

In another exemplary diagnostic method, which is represented in the flow chart of FIG. 5, the load cells 15 of the scale 5 are selected as the component to be monitored 100 and a diagnostic parameter (e.g., temperature, digital signal voltage, supply voltage, or zero balance change) of the individual load cells 15 of the vehicle weighing scale 5 is selected to be monitored 105. Appropriate diagnostic parameter signals from the load cells 15 are received 110 by the computer device (e.g., terminal) 25.

Once the diagnostic parameter signals are received 110 from all of the load cells 15, a standard statistical test can be applied to determine if any of the diagnostic parameter values from each load cell 15 is an outlier (i.e., sample data that is unusually far from the other observations). Several such statistical tests exist and would be well known to those of skill in the art.

One exemplary statistical test, the use of which is reflected in FIG. 5, is known as Chauvenet's Criterion. The basis of Chauvenet's Criterion is that all samples of a data set will fall within a probability band centered on the mean of a normal distribution. This probability band is defined as $P=1-(1/2n)$, where n is the number of samples in the data set. Any data points that lie outside this probability band may be considered as outliers. This is achieved by calculating how many standard deviations the suspected outliers are from the mean 115: $Dmax=(ABS(X-\bar{X}))/S$ (i.e., the absolute value of the difference between each suspected outlier X and the sample mean $\bar{X}$ divided by the sample standard deviation S).

In this particular example, once Dmax has been calculated for all load cells, a comparison can be made 120 to the number of standard deviations that correspond to the bounds of the probability band around the mean (i.e., the Z-value from the standard normal Z-table associated with the defined probability P). If the probability band is not exceeded 125 (i.e., Z-Value≥Dmax), then no problem is indicated and the process returns to the point of receiving a new set of diagnostic parameter signals 110 from all of the load cells 15. If the probability band is exceeded 125 (i.e., Dmax>Z-Value), then a problem with that load cell is indicated 130.

In one further illustration of the foregoing exemplary diagnostic methods, force measuring device temperature output is selected as the diagnostic parameter to be monitored, the vehicle weighing scale 5 may again be used as the exemplary scale device, and the individual load cells 15 thereof may represent the force measuring devices of interest. As mentioned above, a temperature output is typically available from force measuring devices such as load cells for use by a load cell metrology compensation algorithm. As can be understood from the foregoing description, the temperature of the load cells 15 will usually be determined primarily by the environmental temperature in which the load cells are operating. Therefore, it is reasonable to expect that the operating temperature should be approximately the same for all of the like load cells 15 of the scale 5.

It is known from experience that some difference in load cell temperatures may be expected due to the physical distance between the load cells 15, etc. However, it is also possible from experimentation and observation under various environmental conditions to develop an expected, normal temperature spread for the load cells of scales of like or similar design. Consequently, according to the exemplary diagnostic method represented in FIG. 3, the expected temperature spread can be used to set a limit on the amount by which the temperatures of any two given load cells 15 may differ. When the temperature spread between any two load cells exceeds this limit, a problem may be indicated and an alert, such as an alarm, may be triggered.

Alternatively, and according to the exemplary diagnostic method represented in FIG. 4, a median load cell temperature value may be calculated from the temperature of all the load cells, and the deviation of the temperature of each load cell from the median temperature may be determined. A load cell whose temperature deviates from the median temperature by more than a predetermined maximum temperature deviation value may be indicative of a problem with that load cell 15 and may trigger an alert, such as an alarm.

Still alternatively, and according to the exemplary diagnostic method represented in FIG. 5, a statistical test can be applied to determine if the temperature of any load cell is a statistical outlier compared to the temperatures of the other load cells. A load cell whose temperature is determined to be a statistical outlier may be indicative of a problem with that load cell 15 and may trigger an alert, such as an alarm.

Comparing the load cell temperature of a given load cell to the temperature of each of the other load cells of the scale or to a median load cell temperature, or identifying outlying load cell temperatures by statistical analysis eliminates the need for determining and then setting a threshold around the monitored operating parameter itself (i.e., a range of acceptable individual load cell temperatures in this case), which allows the diagnostic parameter comparison to better adapt to changing conditions. This is useful, because in one case a given load cell temperature reading may be indicative of a problem while in another case the same temperature reading may not be indicative of a problem.

As an example of the aforementioned situation, consider a case where the temperature of the ten load cells 15 of the vehicle weighing scale 5 are 20.1° C., 19.7° C., 20.5° C., 20.2° C., 20.9° C., 20.7° C., 19.9° C., 21.0° C., 20.6° C. and 33.2° C. For this example, also assume that the minimum and maximum load cell operating temperatures are −10° C. and 40° C., respectively. In order to avoid speculating as to what sort of environmental conditions the load cells will be subjected to and what range of load cell temperatures may be expected as a result, known diagnostic techniques might very well adopt the −10° C. and 40° C. temperatures as lower and upper diagnostic threshold values for each of the load cells 15. Consequently, no indication of a faulty load cell would be given in this example despite the significantly different temperature of one of the load cells 15, because all of the load cell temperatures are within the allowed threshold values.

In contrast, method embodiments of the invention would identify the 33.2° C. temperature reading as an outlier and possibly indicative of a problem with the associated load cell 15. For example, expected temperature spread data may be used to set a limit on the amount that the temperature of any one load cell may differ from the temperature of another load cell, or to set a limit on the maximum amount the temperature of any load cell may deviate from the median load cell temperature, without indicating a problem with that load cell. For example, depending on the scale design, the load cell design, etc., the temperature spread between any two load cells may not be permitted to differ by more than 5° C. or the temperature of a given load cell may not be permitted to deviate by more than 5° C. from the median load cell temperature, without being identified as an outlier.

Using the previous example of ten load cell temperatures, the maximum temperature spread (i.e., 33.2° C.−19.7° C.=13.5° C.) and the deviation from the median temperature (i.e., 33.2° C.−20.5° C.=12.7° C.) both identify the 33.2° C. temperature as an outlier. The outlying temperature of the given load cell may indicate a problem with that load cell (e.g., a failing temperature sensor) and may trigger an indicator, such as an alarm, before an actual cell failure (e.g., an inaccurate weight output) occurs.

Alternatively, the 33.2° C. temperature reading may be identified as an outlier by one or more of the aforementioned statistical tests for identifying outliers. Applying the aforementioned Chauvenet's Criterion to this example reveals that the value of Dmax for the load cell associated with the 33.2° C. temperature exceeds the expected Z-Value (i.e., 2.83>1.96), thereby identifying the 33.2° C. temperature as an outlier. The outlying temperature of the given load cell may indicate a problem with that load cell (e.g., a failing temperature sensor) and may trigger an indicator, such as an alarm, before an actual cell failure (e.g., an inaccurate weight output) occurs.

In another further illustration of the foregoing exemplary diagnostic methods, force measuring device supply voltage is selected as the diagnostic parameter to be monitored, the vehicle weighing scale 5 may again be used as the exemplary scale device, and the individual load cells 15 thereof may represent the force measuring devices of interest. As mentioned above, an operating supply voltage is typically supplied to such load cells by a controller (e.g., terminal) or another device. The supply voltage to each of the load cells 15 should be approximately the same for all of the force measuring devices in the system, excepting some small differences due to varying cable lengths.

While it is known from experience that some small difference in load cell supply voltages may be expected due to varying cable lengths, it is also possible from experimentation and observation to develop an expected, normal supply voltage for the load cells of scales of like or similar design. Consequently, according to the exemplary diagnostic method represented in FIG. 3, the expected supply voltage spread can be used to set a limit on the amount by which the supply voltages of any two given load cells 15 may differ. When the supply voltage spread between any two load cells exceeds this limit, a problem may be indicated and an alert, such as an alarm, may be triggered.

Alternatively, and according to the exemplary diagnostic method represented in FIG. 4, a median load cell supply voltage value may be calculated from the supply voltages of all the load cells, and the deviation of the supply voltage of each load cell from the median supply voltage may be determined. A load cell whose supply voltage deviates from the median supply voltage by more than a predetermined maximum supply voltage deviation value may be indicative of a problem with that load cell 15 and may trigger an alert, such as an alarm.

Still alternatively, and according to the exemplary diagnostic method represented in FIG. 5, a statistical test can be applied to determine if the supply voltage of any load cell is a statistical outlier compared to the supply voltage of the other load cells. A load cell whose supply voltage is determined to be a statistical outlier may be indicative of a problem with that load cell 15 and may trigger an alert, such as an alarm.

Comparing the supply voltage of a given load cell to the supply voltage of each of the other load cells of the scale or to a median load cell supply voltage, or identifying outlying load cell supply voltages by statistical analysis, eliminates the need for determining and then setting a threshold around the operating parameter itself (i.e., a range of acceptable individual load cell supply voltages in this case), which allows the diagnostic parameter comparison to better adapt to changing conditions. This is useful, because in one case a given load cell supply voltage reading may be indicative of a problem while in another case the same supply voltage reading may not be indicative of a problem.

As an example of the aforementioned situation, consider a case where the supply voltage of the ten load cells 15 of the vehicle weighing scale 5 are 25.1V, 24.7V, 23.5V, 24.2V, 23.9V, 25.0V, 23.7V, 24.8V, 25.2V and 8.2V. For this example, also assume that the minimum and maximum load cell operating supply voltages are 5V and 30V, respectively. In order to avoid speculating as to what range of load cell supply voltages may be expected as a result of the power supply to which the load cells 15 are eventually connected, known diagnostic techniques might very well adopt the 5V and 30V supply voltages as lower and upper diagnostic threshold values for each of the load cells 15. Consequently, no indication of a faulty load cell would be given in this example despite the significantly different supply voltage of one of the load cells 15, because all of the load cell supply voltages are within the allowed threshold values.

In contrast, method embodiments of the invention would identify the 8.2V supply voltage reading as an outlier and possibly indicative of a problem with the associated load cell 15. For example, expected supply voltage spread data may be used to set a limit on the amount that the supply voltage of any one load cell may differ from the supply voltage of another load cell, or to set a limit on the maximum amount the supply voltage of any load cell may deviate from the median load cell supply voltage, without indicating a problem with that load cell. For example, depending on the scale design, the load cell design, etc., the supply voltage spread between any two load cells may not be permitted to differ by more than 5V or the supply voltage of a given load cell may not be permitted to deviate by more than 5V from the median load cell supply voltage, without being identified as an outlier.

Using the previous example of ten load cell supply voltages, the maximum supply voltage spread (i.e., 25.2V−8.2V=17.0V) and the deviation from the median supply voltage (i.e., 24.5V−8.2V=16.3V) both identify the 8.2V supply voltage as an outlier. The outlying supply voltage of the given load cell may indicate a problem with that load cell (e.g., a damaged cable) and may trigger an indicator, such as an alarm, before an actual cell failure (e.g., no weight output due to insufficient voltage) occurs.

Alternatively, the 8.2V supply voltage reading may be identified as an outlier by one or more of the aforementioned statistical tests for identifying outliers. Applying Chauvenet's Criterion to the previous example, the value of Dmax for the load cell associated with the 8.2V supply voltage exceeds the expected Z-Value (i.e., 2.83>1.96) and identifies the 8.2V supply voltage as an outlier. The outlying supply voltage of the given load cell may indicate a problem with that load cell (e.g., a damaged cable) and may trigger an indicator, such as an alarm, before an actual cell failure (e.g., no weight output due to insufficient voltage) occurs.

Figure 6:
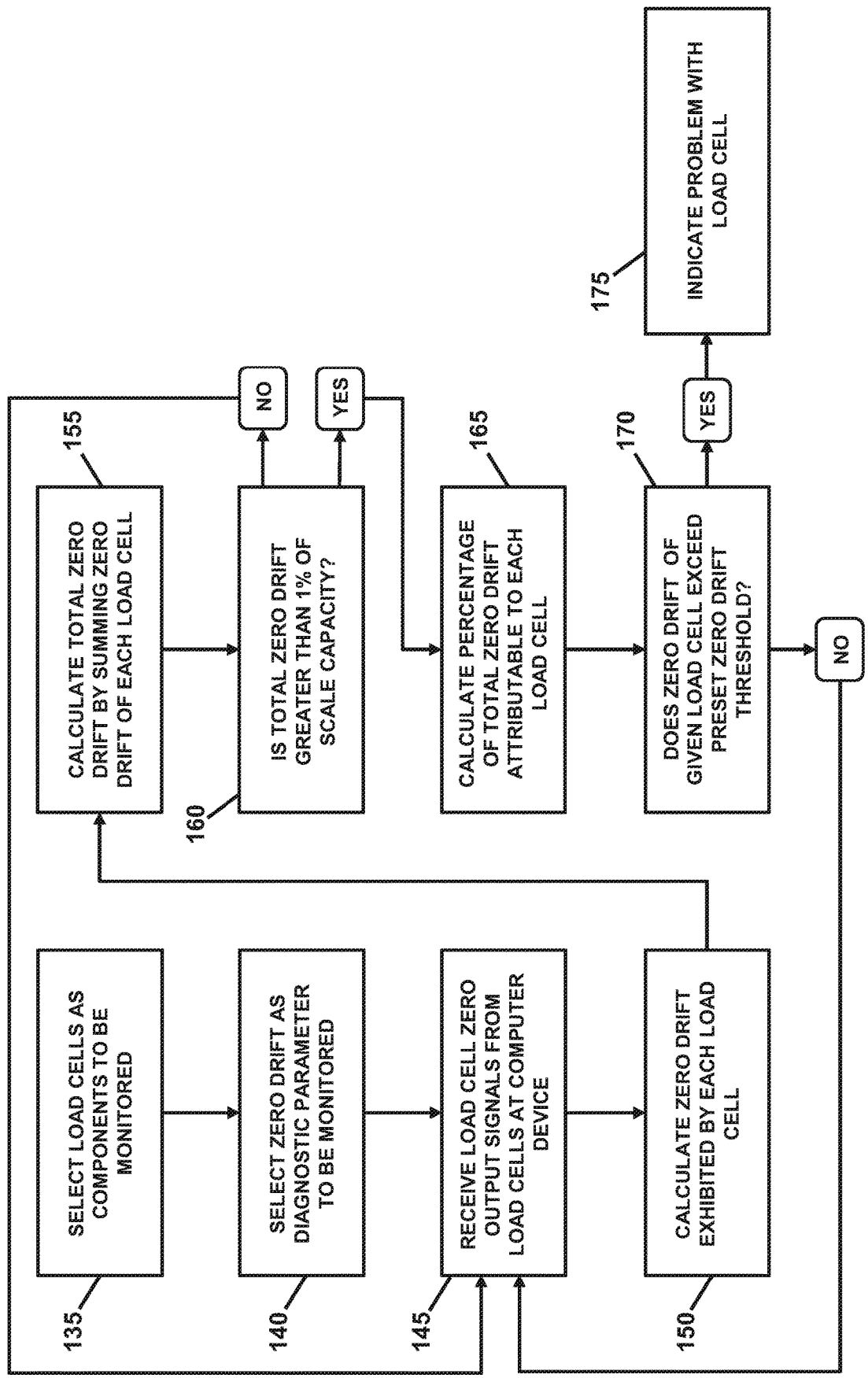
FIG. 6 is a flowchart illustrating the implementation of still another exemplary diagnostic method according to the invention.

In another exemplary diagnostic method according to the invention, which is represented in the flow chart of FIG. 6, the load cells 15 of the scale 5 are selected as the component to be monitored 135 and the zero balance change of the individual load cells 15 of the vehicle weighing scale 5 is selected as the diagnostic parameter to be monitored 140. Appropriate signals from the load cells 15 are received 145 by the computer device (e.g., terminal) 25.

As one of skill in the art would understand, the zero balance procedure involves obtaining a force measuring device output value for each force measuring device of a scale and also a sum of all the force measuring device output values, while the scale is in an unloaded state. Therefore, during the zero balance calibration process for the vehicle weighing scale 5, a zero balance reading for each individual load cell 15 is stored at the terminal 25 and/or otherwise, as is a zero balance reading for the entire scale (i.e., a cumulative value for all of the load cells). Also, each time a scale zero command is issued, the scale is assumed to be in a no load condition.

The zero balance change of the individual load cells 15 may be more accurately described as a zero drift error. During application of the exemplary method to the exemplary vehicle weighing scale 5, a zero drift error may only be recognized, for example, if a zero command is issued (either manually or during the scale power-up process), the scale is not in motion, the zero is in the zero capture range (a set range around the original zero condition for the scale), the total zero drift is above 1% of the scale capacity (a value determined based on the design of the exemplary vehicle weighing scale 5 and the load cells 15 employed), and the acceptable zero drift threshold is exceeded for an individual load cell.

It is first determined whether there has been a significant total load cell zero drift since the last zero command was issued. Total Zero Drift is defined as the sum of the absolute value of the difference between the current and calibrated zero balance reading for each load cell. The zero drift for a given load cell (LC) is determined by the following equation:

$$\text{LC Zero Drift} = \text{abs (Current LC Zero} - \text{Calibrated LC Zero)}$$

and Total Zero Drift for all of the load cells may be determined by the following equation:

$$\text{Total Zero Drift} = \Sigma_{i=1}^{n} \text{LC Zero Drift}[i]$$

where n is the number of load cells in the scale.

With respect to the exemplary vehicle weighing scale 5, the zero drift for each load cell 15 is determined by comparing the current zero reading of the load cell with the zero reading obtained during scale calibration 150. The absolute value differences between the current zero reading and the calibrated zero reading of each load cell are then summed to obtain a Total Zero Drift value 155 for the vehicle weighing scale 5. The calculated Total Zero Drift is then compared to a predetermined percentage of the scale capacity 160. In this particular example, if the calculated Total Zero Drift value for the vehicle weighing scale divided by the scale capacity is greater than 1%, the diagnostic method continues to a first step 165 of a second test. The comparison of Total Zero Drift to scale capacity may be represented as:

IF Total Zero Drift/Scale Capacity>1% THEN Continue to Test 2

The second test is used to determine whether one or a small number of the load cells 15 of the vehicle weighing scale 5 account for the majority of the Total Zero Drift. If each load cell exhibits an approximately equal amount of the Total Zero Drift (i.e., each load cell exhibits a similar amount of zero drift), it is likely that any calculated zero drift is not indicative of a problem with the load cells, but due to another factor such as for example, a simple accumulation or removal of dust, snow, ice, etc., from the scale deck 10. In contrast, if only one or a small number (e.g., two load cells) account for a large percentage of the Total Zero Drift, a load cell problem is likely and should be indicated, whether by an alarm or otherwise.

As discussed above, this diagnostic method is based on a comparison of the selected diagnostic parameter values of all the similar components (load cells 15) in the system (weighing scale 5). Thus, a first step 165 of the second test is operative in this case to calculate percentage of Total Zero Drift attributable to each load cell. The second step 170 of the second test then determines whether the percentage of Total Zero Drift attributable to a given load cell exceeds some preset zero drift threshold value. The steps of the second test may be represented as:

IF (LC Zero Drift[i]/Total Zero Drift)>Zero Drift Threshold THEN increment Zero Drift Error Counter[i]

where the Zero Drift Threshold in this case is a user entered value between 50% and 100% and the default value=50%. In other words, in this example the second test will indicate a problem load cell when the zero drift value of that load cell accounts for 50%-100% of the calculated Total Zero Drift of the scale 5. The zero drift threshold value may vary from scale-to-scale depending on the scale construction, the number of load cells present, the type of load cells used, the load cell sensitivity, the scale capacity, etc. In addition to a zero drift error being indicated 175 as an alarm, etc.; a zero drift error may be recorded in the scale maintenance log along with an identification of the problem load cell(s).

Diagnostic method embodiments according to the invention are implemented on and by a computer device having a processor executing appropriate instructions. The processor may be associated with a software program(s) for this purpose. In at least some exemplary embodiments, the computer device is a scale terminal which, as would be familiar to one of skill in the art, is a device that is in electronic communication with a scale and the force measuring devices thereof and may function to control the scale, display weight readings, display diagnostic information, etc. Two non-limiting examples of such a terminal are the IND560 PDX Terminal and the IND780 Terminal, both available from Mettler-Toledo, LLC in Columbus, Ohio. In other embodiments, diagnostic methods according to the invention may be carried out on a computer device that is separate from the scale terminal, and which may or may not be in communication therewith.

In operation, the computer device receives output signals from a plurality of like components (e.g., force measuring devices) of a given weighing scale that are indicative of the selected diagnostic parameter, evaluates the signals relating to a selected diagnostic parameter associated with the like components to identify outliers and, when an outlier(s) is detected, indicates a problem with the component(s) from which the outlying output was received and/or takes some other action. The processor of the computer device or a software program executed by the processor is provided with the appropriate formulas and threshold or other values necessary to perform any comparisons, evaluations and analysis.

While certain embodiments of the invention are described in detail above, the scope of the invention is not considered limited by such disclosure, and modifications are possible without departing from the spirit of the invention as evidenced by the following claims:

What is claimed is:

1. A diagnostic method for a weighing scale having multiple force measuring devices, comprising:
selecting a plurality of like weighing scale components to be monitored;
selecting as a diagnostic parameter an operating parameter that is common to the selected like weighing scale components and should have approximately the same value for each component during normal operation;
receiving at a computer device from each of the selected weighing scale components, an output signal representative of the selected diagnostic parameter;
at the computer device, applying a standard statistical test to the diagnostic parameter output signal values received from the selected weighing scale components, the standard statistical test selected from the group consisting of Chauvenet's Criterion, Grubbs' Test for Outliers, Peirce's Criterion, and Dixon's Q Test;
determining if the results of the statistical tests indicate that the diagnostic parameter output signal value of any weighing scale component is a statistical outlier compared to the diagnostic parameter output signal values of the other weighing scale components; and
if the results of the statistical tests performed by the computer device indicate that the diagnostic parameter output signal value of a given weighing scale component is an outlier, using the computer device to indicate a problem.

2. A diagnostic method for a weighing scale having multiple force measuring devices, comprising:
selecting a plurality of like weighing scale components to be monitored;
selecting as a diagnostic parameter an operating parameter that is common to the selected like weighing scale components and should have approximately the same value for each component during normal operation;
receiving at a computer device from each of the selected weighing scale components, an output signal representative of the selected diagnostic parameter;
at the computer device, performing a statistical analysis that considers the output signal of a given weighing scale component relative to the output signal of another weighing scale component or to the collective output signals of all of the other weighing scale components, and includes:
applying a standard statistical test to the received diagnostic parameter output signal values received from the selected weighing scale components, the standard statistical test selected from the group consisting of Chauvenet's Criterion, Grubbs' Test for Outliers, Peirce's Criterion, and Dixon's Q Test, and determining if the results of the statistical tests indicate that the diagnostic parameter output signal value of any weighing scale component is a statistical outlier compared to the diagnostic parameter output signal values of the other weighing scale components; and if the results of the statistical analysis performed by the computer device with respect to any given weighing scale component indicates an abnormality in the output signal value of that weighing scale device, using the computer device to indicate a problem.

* * * * *

UNITED STATES PATENT AND TRADEMARK OFFICE
CERTIFICATE OF CORRECTION

PATENT NO. : 10,527,486 B2
APPLICATION NO. : 15/450967
DATED : January 7, 2020
INVENTOR(S) : Wechselberger et al.

It is certified that error appears in the above-identified patent and that said Letters Patent is hereby corrected as shown below:

In the Specification

In Column 12, Line 62, please delete "Total Zero Drift=$\Sigma_{i=1}^{n}$LC Zero Drift[i]" and insert
--$Total\ Zero\ Drift = \sum_{i=1}^{n} LC\ Zero\ Drift[i]$--.

Signed and Sealed this
Twenty-fifth Day of February, 2020

Andrei Iancu
*Director of the United States Patent and Trademark Office*